March 6, 1962     G. M. SKINNER ET AL     3,024,350

ALTERNATING CURRENT ARC PLASMA TORCHES

Filed Jan. 7, 1959

INVENTORS
GEORGE M. SKINNER
ROBERT M. GAGE

BY Barnwell R. King
ATTORNEY

United States Patent Office 3,024,350
Patented Mar. 6, 1962

3,024,350
ALTERNATING CURRENT ARC PLASMA TORCHES
George M. Skinner, Indianapolis, Ind., and Robert M. Gage, Summit, N.J., assignors to Union Carbide Corporation, a corporation of New York
Filed Jan. 7, 1959, Ser. No. 785,441
9 Claims. (Cl. 219—75)

This invention relates to alternating current arc plasma torches and more particularly to multi-anode work-out-of-circuit or non-transferred type arc plasma torches for converting A.C. electric power into a high-temperature high-velocity effluent containing ionized gas.

The invention provides a wall-stabilized arc plasma torch comprising a common cathode in combination with a nozzle composed of a plurality of anodes that are electrically insulated from one another and connected to an alternating current network so that continuous operation of the torch occurs.

Various arc torch apparatus and especially the transferred wall-stabilized arc torch described in Patent No. 2,806,124 and the non-transferred wall-stabilized arc torch described in Patent No. 2,858,411 can be used with either direct current or alternating current electrical power. Direct current straight polarity power has been especially preferred for non-transferred arc operation wherein the arc passes between a stick cathode and a nozzle anode. The highest currents for given electrode size can be carried when the stick cathode is a good emitter, such as thoriated tungsten, and the nozzle anode is cooled copper.

If such apparatus were used for alternating current operation, the current carrying capacity of the torch would be decreased both by the limitations of the tungsten as an anode and the cooled copper as a cathode. Secondly, the arc often would be extinguished due to difficulty in establishing the reverse polarity portion of the operating cycle. This is caused by the higher work function (lower electrode emitting power) of the cooled copper as compared with that of tungsten.

As a result of such problems, alternating current is not extensively used at present in the arc torch industry. As arc torches are used at higher and higher power levels, the cost of rectification equipment to supply the required D.C. power becomes of major economic importance.

It is therefore a major object of the present invention to produce arc torch apparatus and especially wall-stabilized arc torch apparatus which can conveniently operate on alternating current power.

Another object is to increase the current-carrying capacity of an alternating current arc torch.

Still another object is to eliminate the need of expensive rectification equipment required for direct current operation.

The non-transferred arc torch has now been improved by incorporating multiple anode segments in the torch nozzle. These segments are individual electrodes and are electrically insulated from each other. In operation each of the nozzle anode segments is separately connected to an end terminal of a transformer secondary winding while the stick cathode is connected to the centertap on the winding.

Figure 1:
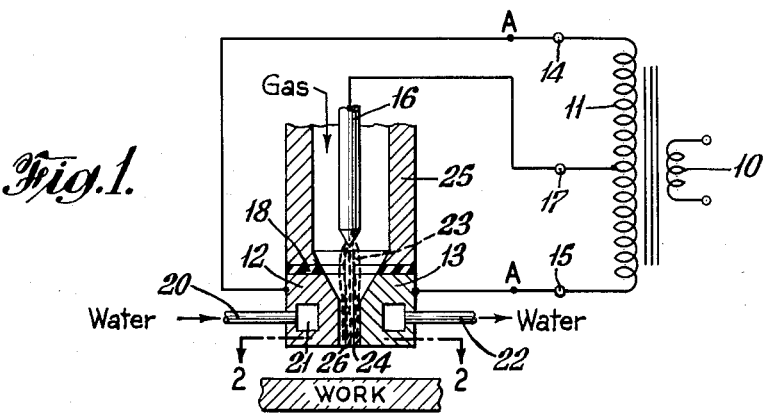
FIG. 1 is a circuit diagram, the torch and work being shown in vertical cross section, illustrating the invention.

In FIG. 1 alternating current power is applied across the terminals of transformer primary winding 10. Appropriate alternating current power is then generated across the terminals of transformer secondary winding 11. Nozzle anode segments 12 and 13 are connected to secondary winding terminals 14 and 15 respectively while stick electrode 16 is connected to centertap 17 of transformer secondary 11. As the alternating current power for secondary winding 11 is applied to nozzle electrode segments 12 and 13, they alternately become electrically positive with respect to the stick electrode 16.

Thus, in effect, direct current straight polarity arcs are alternately established between stick electrode 16 which remains constantly negative and nozzle anode segments 12 and 13. These segments are insulated from the remainder of the torch body 25 by ring-shaped insulator 18. The nozzle electrode segments are maintained below their melting point by passing cooling medium, such as water, from inlet 20 to annular passage 21 and out through outlet 22.

A gas stream passing down through the annular space between stick electrode 16 and torch body 25 forces the arc 23 to terminate along the walls of the nozzle passage 24. The preferred operation of the equipment is for the portion of the arc within passage 24 to be wall-stabilized and collimated by the combination of the nozzle walls and gas stream as is described in more detail in Patent No. 2,858,411.

Figure 2:
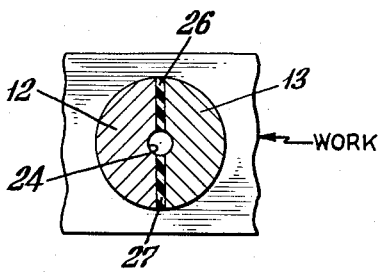
FIG. 2 is a horizontal cross section of the torch taken on line 2—2 of FIG. 1.

As shown in FIGS. 1 and 2, the nozzle anode segments 12 and 13 can be in the form of half-cylinders separated by insulators 26 and 27.

Figure 3:
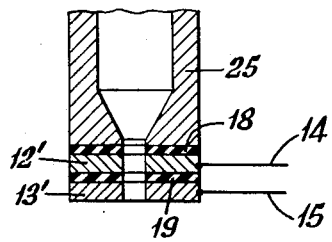
FIG. 3 is a fragmentary vertical cross section of a torch modification of the invention.

In the apparatus modification of FIG. 3, the nozzle anode segments are in the form of rings separated by ring-shaped insulator 19. This apparatus modification can be used in some instances but is not preferred because of the increased tendency to form arcs between nozzle segments.

The current-carrying capacity of a given arc torch is effected quite strongly by the cooling efficiency of the nozzle electrode. If the heat generated at the anode is not effectively removed, both by heat transfer to the effluent gas stream and to the internally circulating cooling medium, the anode will begin to melt. In prior art torch devices an equilibrium is established between arc current and heat loss which determines the maximum continuous arc power which can be used.

In the novel apparatus of the present invention, each of the nozzle electrodes is being continuously cooled but is only receiving power for a maximum of one-half of the operating cycle. Therefore, increased total power can be used and each anode segment is effectively heated to a temperature not over that attained under prior art lower power operation. The reduction in effective anode area at any given instant is not a serious problem since the arc normally only uses a small portion of the available anode surface.

This improved apparatus thus has the advantage of conveniently employing alternating current power and effectively operating internally on efficient direct current straight polarity power. It also has the advantage of allowing higher currents to be employed for a given size electrode area than could be used with prior arc torch devices operating either on A.C. or D.C.

Under extremely high power operation the self-rectification of the present novel circuit might be aided by positioning rectifiers, for example of the silicon type, at positions A shown in FIG. 1.

Figure 4:
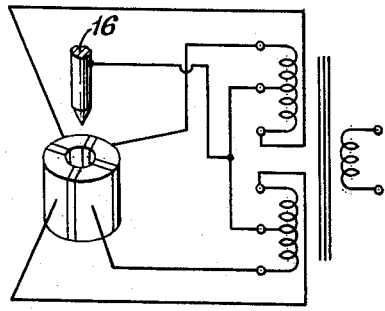
FIGS. 4 and 5 are views partly in perspective of additional modifications of the invention.

Still another modification of apparatus and circuitry of the present invention is shown in FIG. 4.

Figure 5:
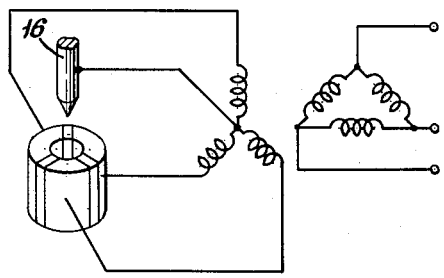

Multiphase A.C. operation can be carried out using apparatus of the type shown in FIG. 5. This particular circuit and apparatus, as shown, is designed for three-phase power.

The main advantage of the present invention is in the apparatus-circuitry combination which enables the torch to be supplied economically and conveniently with A.C. power and yet effectively operate internally on direct current straight polarity power.

We claim:

1. A wall-stabilized arc plasma torch comprising the combination of a central cathode, gas passage means comprising a body surrounding said cathode in spaced relation to provide an annular gas passage, a nozzle having a wall-stabilizing central outlet passage in line with the end of said cathode, and annular means electrically insulating said nozzle from said body, said nozzle consisting of a plurality of segments constituting anodes, and means electrically insulating said anodes.

2. A wall-stablized arc plasma torch as defined by claim 1, in which said anodes are in the form of segments of a cylinder concentric with the axis of such central outlet passage.

3. A wall-stabilized arc plasma torch as defined by claim 1, in which said anodes are in the form of flat rings.

4. The combination with a wall-stabilized arc plasma torch as defined by claim 1, of an alternating current power supply connected to such cathode and anodes by means of a network such that current rectification occurs within the torch, resulting in continuous operation thereof.

5. The combination with a wall-stabilized arc plasma torch as defined by claim 1, of a transformer having a secondary provided with a centertap connected to said cathode, and with terminals connected to said anodes, whereby the A.C. output of said transformer is rectified in said torch, resulting in continuous operation thereof.

6. The combination with a wall-stabilized arc plasma torch as defined by claim 2, in which said segments are half-cylinders, of a single phase transformer having a secondary winding provided with a centertap connected to said cathode, and two terminals each of which is connected to one of said segments for continuous operation of the torch.

7. The combination with a wall-stabilized arc plasma torch as defined by claim 1, in which said anodes are flat rings electrically insulated from each other, of a single phase transformer having a secondary winding provided with a centertap connected to said cathode, and two terminals each of which is connected to one of said segments for continuous operation of the torch.

8. The combination with a wall-stabilized arc plasma torch as defined by claim 1, in which said anodes are a plurality of segments of a cylinder, of a transformer having polyphase secondary windings connected to said cathode and anodes so that continuous operation of the torch results.

9. An arc plasma torch comprising the combination of a central cathode, gas passage means comprising a body surrounding said cathode in spaced relation to provide an annular gas passage, a nozzle having a central outlet passage in line with the end of said cathode, and annular means electrically insulating said nozzle from said body, said nozzle consisting of a plurality of segments constituting anodes, and means electrically insulating said anodes.

References Cited in the file of this patent

UNITED STATES PATENTS

| | | |
|---|---|---|
| 2,052,796 | Rava | Sept. 1, 1936 |
| 2,768,279 | Rava | Oct. 23, 1956 |
| 2,858,411 | Gage | Oct. 28, 1958 |